No. 794,767. PATENTED JULY 18, 1905.
L. F. ADT.
EYEGLASSES.
APPLICATION FILED AUG. 4, 1904.
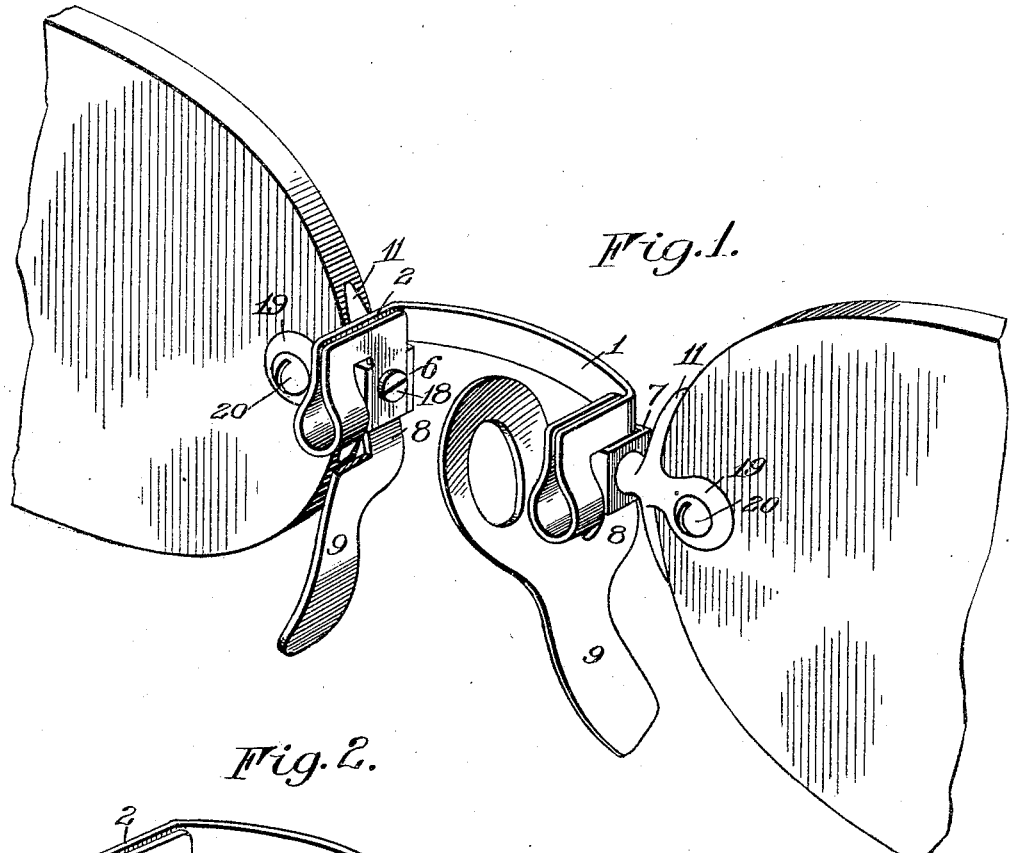
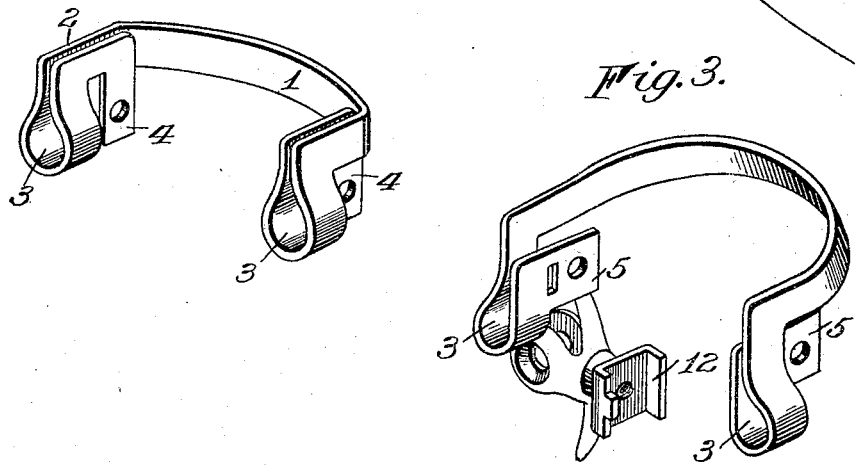
Witnesses
Walter B. Payne.
Russell B. Griffith.
Inventor
Leo F. Adt
By
Attorney No. 794,767. Patented July 18, 1905.

UNITED STATES PATENT OFFICE.

LEO F. ADT, OF TROY, NEW YORK.

EYEGLASSES.

SPECIFICATION forming part of Letters Patent No. 794,767, dated July 18, 1905.

Application filed August 4, 1904. Serial No. 219,483.

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, more especially to that class wherein the lenses are connected by a relatively elastic or resilient bridge which is capable of being operated by the manipulation of the lenses in order that the nose-engaging devices may be separated; and the purpose of my invention is to provide eyeglasses of this character which permit ample separation of the nose-guards with the least strain upon the spring and which enable a wide range of adjustment in order that they may be properly fitted to the facial characteristics of different persons, the parts of the spring being so formed as to be substantially invisible; and to these and other ends it consists in certain improvements and combinations and arrangements of parts that will be hereinafter more fully explained, the novel features being pointed out particularly in the claims hereunto annexed.

In the drawings, Figure 1 is a perspective view of a pair of eyeglasses embodying my invention. Fig. 2 is a perspective view of the spring with the lenses and guards detached; and Fig. 3 is a view similar to Fig. 2, showing a modified form of spring.

My invention as embodied in its present form is shown applied to that type of eyeglasses wherein the lenses are connected by a resilient bridge which is capable of being manipulated by a relatively horizontal bending of the lenses to cause a separation of the nose-guards, and in that embodiment of my invention which is shown in Figs. 1 and 2 it comprises a bridge-spring 1, the central portion of which is preferably arched and provided with the rearwardly-extending arms 2, which are disposed in approximately a horizontal plane, and to these arms are connected the doubled or looped portions 3, which preferably extend downwardly from the rear ends of the arms 2 and are formed by bending the material downwardly from the said arms, thence inwardly, and finally upwardly to form the substantially vertically disposed loops the arms of which lie in a plane substantially parallel with that of the lenses. In one form of my invention the free end of each loop is extended forwardly and thence downwardly to form the attaching-arm 4, which will occupy a relatively vertical position, as shown in Figs. 1 and 2, or, if desired, the free end of each loop 3 may be extended directly forward in a direction transversely to the plane of the lenses to enable the attaching-arm 5 thus formed to enter the lens-attaching device from the rear, as shown in Fig. 3. These lens-attaching devices may be of any desired construction, those shown embodying the box 6, which in Fig. 1 is provided with the vertically-extending seat 7 to receive the attaching-arm 8 of the guard 9, which may be of any desired form and the substantially vertically extending attaching portion 4 of the spring, a fastening-screw or other device 1 being employed for securing these attaching portions in position relatively to the attaching devices, lenses being secured to these devices in any suitable manner, such as by the clamping-lugs 19 and screw 20, which engage the opposing faces of the lens and the projections 11, which engage the edge thereof. In that form of spring shown in Fig. 3 the attaching-arms 5 of the spring are secured to the attaching devices from the rear or in a direction transversely to the plane of the lenses, and I therefore employ an attaching device 12, which is capable of receiving the horizontally-extending attaching-arm 5.

Eyeglasses embodying my invention enable a wide range of adjustment to be obtained by the optician in fitting them to the wearer, as the increased length of the spring permits ample adjustment for pupillary distance and the shaping of the spring in order to compensate for the irregular facial characteristics of the wearer, while the disposition of the material of the spring is such as to render a large portion of it practically invisible, especially so when flat material is employed, although I do not so limit myself. Moreover, the increased length of spring amplifies the resilient action of the bridge, and by forming the vertical loops 3 in the spring the action of the latter during the manipulation of the lenses will not only be a flexing or bending one upon the rearwardly-extending arms 2 and the central portion of the spring, but will be a torsional one by reason of the disposition of the loops 3, and while in some cases it may be advantageous to extend the attaching portions of the spring upwardly and forwardly, and thus add the bending action of the arms 4 to that of the spring, it will be understood that these attaching portions may be led directly forward from the loops to the attaching devices, as in Fig. 3, for it will be observed that in such a spring the range of adjustment of the arms 2 in a relatively lateral direction for pupillary distance, for instance, will be practically unlimited. It is preferable to form these springs of flat material, for the reason that it enables comparatively heavy springs to be employed, the arms 2 and 4 and the loops 3 of which will present their edges instead of their flat surfaces toward the front of the eyeglasses; but it will be understood that material of different cross-sections may be employed, if desirable. Moreover, by forming the springs in the manner above described the approximate center about which the guards move during the manipulation of the lenses will be near the attaching devices, thus insuring the maximum separation of the guards, and by extending the ends of the spring beyond these attaching devices and forming the loops in rear thereof these loops will be practically invisible from the front of the eyeglasses and will not obstruct the field of vision.

I claim as my invention—

1. In eyeglasses, the combination with the lenses, of a bridge composed of resilient material embodying the central portion having the substantially horizontal rearwardly-extending arms, and the substantially vertically disposed loops attached to said arms and secured to the lenses, and having their arms arranged in a plane substantially parallel to that of the lenses.

2. In eyeglasses, the combination with the lenses, of a bridge carrying the attaching devices composed of resilient material embodying the central portion having the rearwardly-extending arms, and the loops located in rear of the attaching devices, each having one arm thereof connected to the rearwardly-extending arm of the spring, and the other arm to the attaching devices for the lenses, the arms of the loops lying in a plane substantially parallel to that of the lenses.

3. In eyeglasses, the combination with the lenses having the attaching devices, of a bridge-spring embodying the central portion having the substantially horizontal rearwardly-extending arms, and the loops the arms of which lie in a plane parallel to that of the lenses and forming a connection between the rearwardly-extending arms of the spring and the attaching devices.

4. In eyeglasses, the combination with the lenses having the attaching devices, of a bridge-spring embodying the central portion having the rearwardly-extending arms which are provided with loops that are located in rear of the attaching devices, the arms of said loops lying in a plane substantially parallel with that of the lenses, and forming a connection between the spring and the attaching devices.

5. In eyeglasses, the combination with the lenses having the attaching devices, of a bridge-spring embodying the central portion having the arms extending substantially transversely to the plane of the lenses, and the loops formed substantially at right angles to the said arms the arms of the loops lying in a plane substantially parallel to the plane of the lenses and forming a connection between the arms of the spring and the attaching devices.

6. In eyeglasses, the combination with the lenses, of a bridge-spring connecting them embodying the central portion the ends of which extend rearwardly, thence downwardly inwardly and upwardly, the ends of the loops thus formed being attached to the lenses.

7. In eyeglasses, the combination with the lenses, of a bridge-spring connecting them embodying the central portion, the ends of which extend rearwardly, thence doubled downwardly, inwardly upwardly and forwardly to form attaching portions adapted to be connected to the lenses.

LEO F. ADT.

Witnesses:
CHARLES S. ALDRICH,
GEO. B. HARRISON.